June 19, 1934.  R. W. WAMPLER  1,963,569
SAFETY GLASS
Filed June 27, 1931
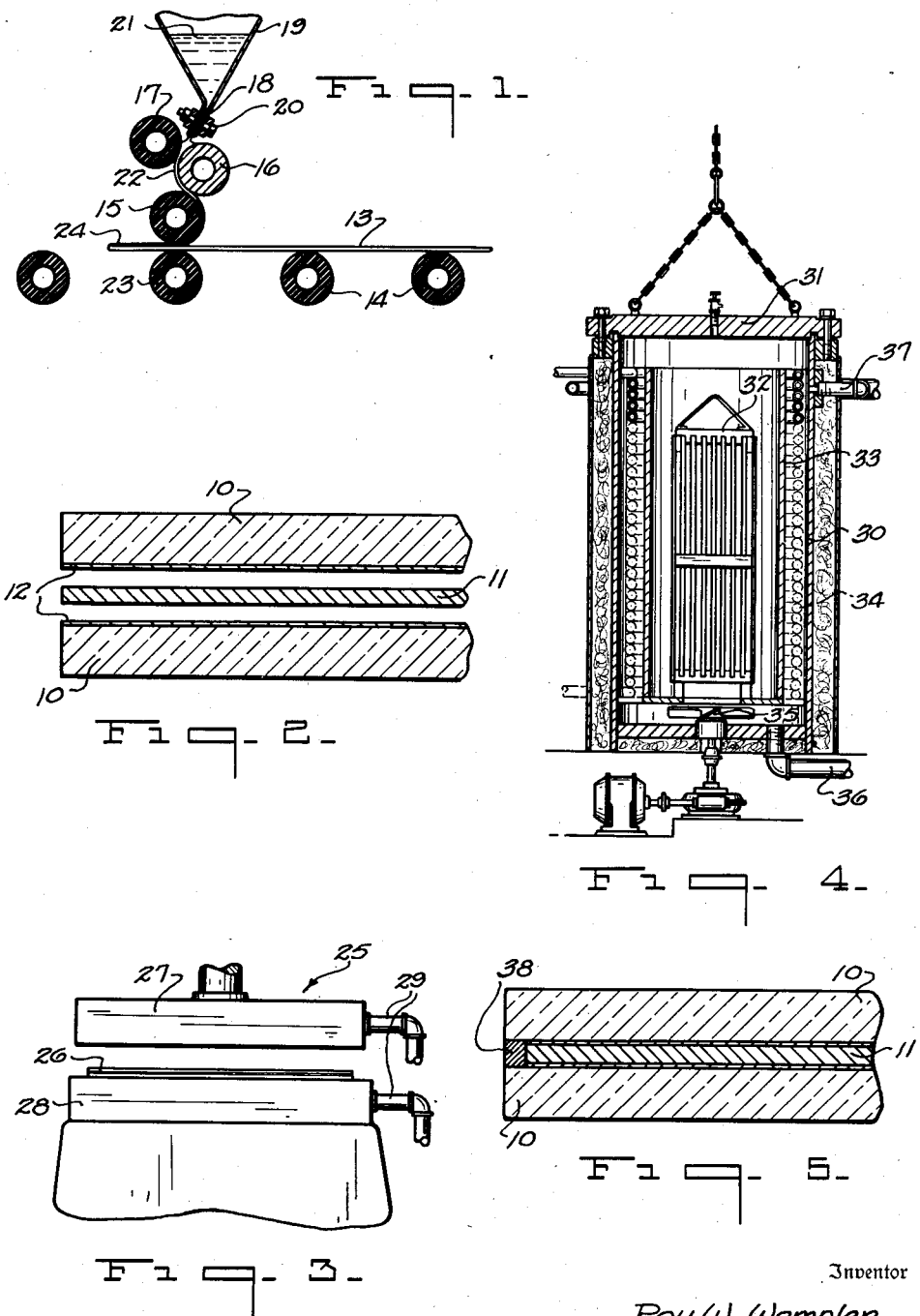
Inventor
Roy W. Wampler
By Frank Fraser
Attorney Patented June 19, 1934

1,963,569

UNITED STATES PATENT OFFICE 1,963,569

SAFETY GLASS

Roy W. Wampler, Toledo, Ohio, assignor to Libbey-Owens-Ford Glass Company, Toledo, Ohio, a corporation of Ohio Application June 27, 1931, Serial No. 547,288

10 Claims. (Cl. 49—81)

The present invention relates to the art of safety glass manufacture and more particularly to an improved bonding medium.

The expression "safety glass" is used to designate a composite structure usually consisting of two or more sheets of glass with one or more interposed non-brittle layers, for example pyroxylin plastic sheets. The value of such a composite structure is dependent, among other things, upon the adequacy and permanency of the bond between the laminations, clearness of vision, and stability of the sheet.

It is an object of the present invention to provide a process for producing an improved safety glass wherein the bond inducing medium or bonding agent can be applied easily and by mechanical means if desired. The invention also contemplates the use of a bonding agent including a mixture of casein and a solvent therefor, which mixture or solution, after it has been applied to the laminations, does not require drying or seasoning, thereby reducing the possibility of introduction of dirt between the laminations. By the use of my improved mixture and method of application thereof, the resultant composite sheet possesses an exceptionally tenacious bond, the sheet is exceedingly stable, and clear to vision. Further, by the use of the present invention, the cost of manufacturing safety glass is comparatively low because of the few operations required.

Other objects and advantages of the invention will become more apparent during the course of the following description when taken in connection with the accompanying drawing.

In the drawing wherein like numerals are employed to designate like parts throughout the same, Fig. 1 is a diagrammatic vertical longitudinal section through a form of machine that can be used in the applying of my improved bonding agent to the laminations, Fig. 2 is a fragmentary vertical section through the laminations before they have been treated and arranged in proper superimposed relationship. For purposes of illustration, the laminations are indicated in spaced relation, Fig. 3 is a diagrammatic showing of one form of pressing instrumentality that can be used in the carrying out of the process, Fig. 4 is a vertical transverse section through a form of autoclave that can be employed, and Fig. 5 is a fragmentary sectional view of a finished sheet of safety glass, and showing the use of a weather-resisting seal.

Referring to Fig. 2, the numeral 10 designates the sheets of glass between which is arranged the non-brittle layer 11. It is preferred that the non-brittle layer be formed from pyroxylin plastic, cellulose acetate, or the like. As shown in Fig. 2, the glass sheets 10 are each provided on their inner surfaces with the coatings 12 of bonding material.

It is an aim of the present invention to provide a bonding agent that will act not only as an adhesive between the laminations, but will also include a solvent or mixture of solvents adapted to act upon the non-brittle layer 11.

I have found that a bonding agent formed from a mixture of casein and a relatively high boiling point, low vapor pressure solvent to give very satisfactory results in the production of commercial safety glass. Such a mixture can be made by mixing 4 parts of casein, 91 parts of a high boiling point, low vapor pressure solvent, for example diethylene glycol, and 5 parts of a mild alkali, for example ammonium hydroxide, having a specific gravity of 0.9. This mixture is reacted at a temperature of approximately 212° F. for a period of about three hours.

The resulting mixture can be used as the bonding agent between glass and pyroxylin plastic layers to give a composite sheet of safety glass of very high quality. It will, of course, be understood that I am not restricted to the exact proportions or examples given above, as the proportions can be varied.

Another very satisfactory mixture, which is given by way of example, can be formed by reacting casein, borax, and diethylene glycol in the approximate proportions of 7 parts casein, 1 part borax, and 92 parts diethylene glycol at a temperature of approximately 212° F. for a period of about three hours.

Although diethylene glycol is specifically mentioned, it is my intention to include all of the polyglycols, and it may be mentioned that I have used a mixture of diethylene glycol and triethylene glycol as the solvent in the bonding agent. In addition to the borax and ammonium hydroxide included as mild alkalies, other such alkalies, for example tri-sodium phosphate, can be employed.

In addition to giving a very satisfactory and stable bonding agent, the above mixtures are very desirable because they permit of their application by means of a machine such as is illustrated in Fig. 1, which tends to reduce, if not eliminate, the hazard of dirt, etc. in the preparation and assembly of the laminations. In Fig. 1, the numeral 13 designates a sheet of glass being supported upon and conveyed by the rollers 14 beneath the coating roll 15. The coating roll 15 is preferably a high grade rubber member, although it can be formed from any other satisfactory compressible material. Cooperating with the compressible roll 15 is a preferably metallic roll 16, for example steel, which in turn contacts with a second compressible member 17. The rolls 16 and 17 are arranged to form a pocket beneath the discharge spout 18 of the container 19. The opening of the discharge spout 18 can be controlled by the adjusting mechanism 20 which determines the amount of the bonding material 21 flowing from the hopper into the pocket formed between the rolls. The rolls are all adjustably mounted and by varying the pressure between the three rolls, the deposit of bonding agent on the rolls and therefore on the glass 13 is controlled. While the bonding material is illustrated in the form of a film as at 22 for purposes of illustration, in actual practice, the entire peripheries of all of the rolls are covered with a thin film of the bonding agent. The space between the rolls 15 and 23 is adjusted in relation to the thickness of the glass sheet 13 to give any desired pressure upon the glass, thereby controlling the thickness of the deposit 24 on the glass 13.

When using a gelatin cement in the prior art, it was customary, after spraying the gelatin solution on the glass to thoroughly dry the said gelatin to give a closely adherent skin to the glass. Incidentally, these gelatin solutions, it is understood, were water gelatin mixtures and the drying operation was to reduce the water content so that the gelatin film would be "subsantially free from contained moisture" and dry to sight and touch.

One of the many advantages of the instant invention is that there is no requirement for drying or seasoning of the film or deposit on the glass. As a matter of fact, in accordance with my process, the skins or films 12 in Fig. 2 are "wet" or moist both to sight and touch at the time of assembly with the pyroxylin plastic.

As hereinabove pointed out, I depend not only on the adhesive characteristics of the casein for bonding action, but also employ the solvent action of the solvent part of the mixture on the non-brittle layer to assist in giving a satisfactory bond between the laminations. The adhesive part of the mixture adheres very closely to the glass sheets, while the solvent constituents attack the non-brittle layer, particularly upon the elevation of temperaure in a manner to bring about a very close union between the various laminations.

After the laminations have been placed in the positions illustrated in Fig. 2, the sandwich so formed is preferably subjected to the combined action of heat and pressure. While the present invention is in no way limited to any particular method of pressure treatment, by way of example, it is set forth that the sandwich may be given a preliminary pressing in a platen press such as is illustrated in Fig. 3 and designated in its entirety by the numeral 25. In this construction, it will be seen that the sandwich 26 is placed between the platens 27 and 28. Means 29 are associated with the platens for controlling the temperature thereof. There is no particular limits of temperature, time, and pressure required in the treatment in the press 25, although satisfactory results will be obtained when pressing the glass for three to five minutes at a temperature of over 200° F. and at a pressure approximately 100 pounds per square inch. After removal from the press, the sandwich may be placed in an autoclave such as shown in Fig. 4.

In Fig. 4, it will be seen that the autoclave comprises an insulated casing 30 having a removable top 31. The sandwiches may be arranged in the removable rack 32 in the compartment formed within the autoclave by the wall 33. Heating coils 34 may be arranged between the wall 33 and casing 30 and through which temperature regulating means can be circulated. An agitator 35 extends through the bottom of the autoclave while conduits 36 and 37 are employed for the purpose of placing a fluid under pressure within the autoclave during the pressing cycle. Any other form of autoclave or retort can be used in lieu of the one shown.

Any suitable fluid, for example, a pyroxylin plastic solvent, or gas, for example air, can be used as the fluid pressing medium in the autoclave. Satisfactory results will be obtained when subjecting the glass to 200 pounds pressure per square inch for a period of approximately twelve to fifteen minutes and at a temperature of 250° F. while within the autoclave. Obviously, the sandwich can be finished in the platen type of press such as is shown in Fig. 3 and the autoclave operation dispensed with.

In Fig. 5 is illustrated diagrammatically the finished sheet. It is my preference, especially when using pyroxylin plastic, that the marginal portions of the glass be undercut to permit of the insertion of a weather-resisting seal 38. Ordinary pyroxylin plastic is subject to expansion and contraction due to weather changes, and if the plastic is exposed directly to the atmosphere, there may be a tendency for marginal separations to develop. The employment of a weather-resisting seal serves as a safeguard against such tendency.

The spreading of the adhesive solution upon the glass with the coating apparatus described is referred to as a mechanical application of the solution in contra-distinction to the dipping or spraying of such solution onto the glass. However, as has already been mentioned, the use of this improved bonding agent is not necessarily dependent upon the application thereof by means of the coating machine.

It is pertinent to note, however, that by applying the bonding agent to the glass in this manner, the tendency toward the introduction of dirt into the film is reduced to a minimum, and furthermore it has been found that this coating device produces a relatively uniform deposit or film upon the glass with very little effort. As a matter of fact, it is only necessary to feed the glass through the rolls when properly adjusted to get such a uniform deposit.

As the coated glass can be assembled with the non-brittle layer immediately upon issuance of the glass from between the rolls, the tendency toward the introduction of dirt into the film and therefore the finished sheet is reduced to a minimum. However, while it is preferred that the assembling of the laminations in sandwich form takes place promptly as the glass leaves the film applying machine, it will be understood that such prompt assembling of the coated glass is to eliminate dirt hazard and not because the bonding material is of such character that it must be assembled rapidly to get the desired bond.

With the type of bonding agent above described, the solvent used, for example, diethylene glycol, acts upon the surfaces of the pyroxylin plastic or other cellulose composition material, and the solvent action is such that there is, in effect, a cellulose cement created on the surface of the plastic. Also, the casein in the solution adheres strongly to the glass surfaces and likewise the cement formed on the surface of the plastic adheres to the gelatin so that a strong and permanent bond between the laminations is obtained.

While the process has been described by setting forth that the coating is applied to the surfaces of the glass, it will of course be appreciated that this coating can be applied to the surfaces of the non-brittle membrane as well as to the surfaces of the glass, or both.

In some instances, it may be desirable to dilute my improved mixture, and I have found that varying amounts of water up to 50% of the solvent can be added to the mixture without materially affecting the quality of the laminated product. However, the addition of water to the mixture does not necessitate drying of the deposit on the glass sheets. The addition of the water in no way necessitates a change in the method of application of the bonding agent or the treatment of the laminations.

It is preferred that a relatively high boiling point, low vapor pressure solvent or mixture thereof be used in the mixture so that the resulting mixture will have a sufficiently low vapor pressure that there will be no noticeable tendency towards instability of either the bonding agent or the plastic, due to the presence of the bonding agent, in the laminated sheet when it is subjected to the varying climatic conditions normally encountered in actual use.

It is to be understood that the form of the invention herewith described is to be taken as the preferred embodiment of the same and that various changes in the ingredients and proportions may be resorted to without departing from the spirit of the invention or the scope of the subjoined claims.

I claim:

1. The process of producing safety glass, consisting in reacting casein in, a mild alkali, and a polyglycol, then depositing such solution on one surface each of two sheets of glass, interposing a translucent plastic layer between the coated surfaces of the two glass sheets, and then subjecting the sandwich thus formed to the combined action of heat and pressure to produce a composite structure.

2. The process of producing safety glass, consisting in reacting casein in, a mild alkali, and a polyglycol, then depositing such solution on one surface each of two sheets of glass, interposing a cellulose composition material sheet between the coated surfaces of the two glass sheets, and then subjecting the sandwich thus formed to the combined action of heat and pressure to produce a composite structure.

3. The process of producing safety glass, consisting in reacting casein in, a mild alkali, and a polyglycol, then depositing such solution on one surface each of two sheets of glass, interposing a pyroxylin plastic sheet between the coated surfaces of the two glass sheets, and then subjecting the sandwich thus formed to the combined action of heat and pressure to produce a composite structure.

4. The process of producing safety glass, consisting in reacting casein in, a mild alkali, and diethylene glycol, then depositing such solution on one surface each of two sheets of glass, interposing a translucent plastic layer between the coated surfaces of the two glass sheets, and then subjecting the sandwich thus formed to the combined action of heat and pressure to produce a composite structure.

5. The process of producing safety glass, consisting in reacting approximately 4 parts casein in, 5 parts ammonium hydroxide, and 91 parts diethylene glycol, then depositing such solution on one surface each of two sheets of glass, interposing a translucent plastic layer between the coated surfaces of the two glass sheets, and then subjecting the sandwich thus formed to the combined action of heat and pressure to produce a composite structure.

6. As a new article of manufacture, a sheet of safety glass consisting of two sheets of glass and an interposed translucent plastic membrane bonded together by the aid of a reaction product formed from casein, a mild alkali, and a polyglycol.

7. As a new article of manufacture, a sheet of safety glass consisting of two sheets of glass and an interposed translucent plastic membrane bonded together by the aid of a reaction product formed from casein, a mild alkali, and diethylene glycol.

8. As a new article of manufacture, a sheet of safety glass consisting of two sheets of glass and an interposed translucent plastic membrane bonded together by the aid of a reaction product formed from casein, ammonium hydroxide, and diethylene glycol.

9. As a new article of manufacture, a sheet of safety glass consisting of two sheets of glass each having a coating thereon including casein, a mild alkali, and a polyglycol reacted in the absence of water, and a translucent plastic membrane positioned between said coatings and united thereto.

10. As a new article of manufacture, a sheet of safety glass consisting of two sheets of glass and an interposed pyroxylin plastic sheet bonded together by the aid of a reaction product formed from casein, a mild alkali, and a polyglycol.

ROY W. WAMPLER.